(12) United States Patent
Hampel et al.

(10) Patent No.: US 10,568,296 B2
(45) Date of Patent: Feb. 25, 2020

(54) PEN FRONT

(71) Applicants: Lance T. Hampel, Fredericksburg, TX (US); Edward G. Wolk, Slinger, WI (US)

(72) Inventors: Lance T. Hampel, Fredericksburg, TX (US); Edward G. Wolk, Slinger, WI (US)

(73) Assignee: L.T. Hampel Corp., Germantown, WI (US)

( * ) Notice: Subject to any disclaimer, the term of this patent is extended or adjusted under 35 U.S.C. 154(b) by 995 days.

(21) Appl. No.: 14/868,983

(22) Filed: Sep. 29, 2015

(65) Prior Publication Data

US 2016/0095289 A1    Apr. 7, 2016

Related U.S. Application Data

(60) Provisional application No. 62/058,303, filed on Oct. 1, 2014.

(51) Int. Cl.
*A01K 1/00* (2006.01)
*E06B 11/02* (2006.01)
*E05D 7/10* (2006.01)

(52) U.S. Cl.
CPC ............ *A01K 1/0017* (2013.01); *E06B 11/02* (2013.01); *E05D 7/1044* (2013.01)

(58) Field of Classification Search
CPC .... A47D 13/06; A47D 13/061; A47D 13/065; A01K 1/0017; A01K 1/088; E06B 11/00;
(Continued)

(56) References Cited

U.S. PATENT DOCUMENTS 2,694,215 A * 11/1954 Simpkins ................. E05D 7/12
                                                 16/231
3,051,127 A    8/1962 Norbury
(Continued)

FOREIGN PATENT DOCUMENTS

CA           164475 S      5/2016

OTHER PUBLICATIONS

Priefert Manufacturing—Farm, Ranch and Rodeo Equipment, http://web.archive.org/web/20140901072636/http://www.priefert.com, Sep. 1, 2014, 4 pages.

(Continued)

*Primary Examiner* — Richard G Davis
(74) *Attorney, Agent, or Firm* — Quarles & Brady LLP

(57) ABSTRACT

A generally hollow plastic molded pen front provides multiple operating positions of the door having sets of interdigitating hinge knuckles on the door and door jamb on both the left and right side. The door also may be swung in or out, and one or more stops can be provided for any of four configurations—left hinged swing in; left hinged swing out; right hinged swing in; right hinged swing out. With the stops removed, the door may be swung both in and out. In one embodiment a J-shaped latching rod secures both the upper and lower portions of the door when latched and a J-shaped hinge rod cooperates on the other side and can use some of the same holes as the latching rod. In another embodiment, a pivoting handle works to secure the door in a catch channel for all six configurations. Other integrated features provide a choice of feed opening sizes and a guard that minimizes feed and water contamination.

30 Claims, 18 Drawing Sheets

(58) Field of Classification Search
CPC .... E06B 11/022; E06B 11/023; E06B 11/026; E05D 7/02; E05D 7/1044
See application file for complete search history.

(56) References Cited

U.S. PATENT DOCUMENTS

| | | | |
|---|---|---|---|
| 3,389,424 A * | 6/1968 | Fellwock | E05D 7/02 |
| | | | 16/392 |
| D219,926 S | 2/1971 | Lage | |
| 4,696,259 A | 9/1987 | Fewox | |
| 5,036,796 A | 8/1991 | deMuy et al. | |
| D351,688 S | 10/1994 | Northrop et al. | |
| D380,053 S | 6/1997 | Forsland | |
| 5,735,079 A | 4/1998 | Davlantes | |
| D396,300 S | 7/1998 | Grimaldi | |
| D538,942 S | 3/2007 | Grundy | |
| 8,186,306 B2 | 5/2012 | Hampel | |
| D685,532 S | 7/2013 | Hampel et al. | |
| 8,763,561 B2 | 7/2014 | Hampel | |
| 8,875,772 B1 | 11/2014 | Dixon, Jr. | |
| 8,973,533 B2 | 3/2015 | Hampel et al. | |
| 9,615,672 B2 * | 4/2017 | Weisbeck | A47D 13/066 |
| D787,708 S * | 5/2017 | Cha | D25/48.5 |
| D789,620 S | 6/2017 | Hampel | |
| 2006/0065209 A1 | 3/2006 | May et al. | |
| 2013/0081575 A1 * | 4/2013 | Hampel | A01K 1/0088 |
| | | | 119/502 |
| 2015/0042119 A1 | 2/2015 | Distelrath | |

OTHER PUBLICATIONS

Sioux Steel Cattle & Livestock Handling Equipment, http://web.archive.org/web/20120608095619/http://www.eckermansonline.com/dist/siouxcattlechutesandlivestockequipment.html, Jun. 8, 2012, 4 pages.

RSI Calf Systems, Calf Pens Photo, 2013 (see also www.rsicalfsystems.com/calf_pens.php).

* cited by examiner

PEN FRONT

CROSS-REFERENCE TO RELATED APPLICATIONS

This claims the benefit of U.S. Provisional Patent Application No. 62/058,303 entitled "Pen Front" filed Oct. 1, 2014, the entire disclosure of which is hereby incorporated by reference for all purposes.

STATEMENT CONCERNING FEDERALLY SPONSORED RESEARCH OR DEVELOPMENT

Not applicable.

FIELD OF THE INVENTION

This invention relates to a molded plastic front panel containing a door for an animal pen confinement system.

BACKGROUND OF THE INVENTION

Livestock confinement pens such as those disclosed in U.S. Pat. No. 8,186,306 and commercially available from L. T. Hampel Corporation have attained widespread usage and are well known. Such pens are made from multiple generally planar panels that are molded plastic and fit together at the corners to create a single free-standing pen or a system containing any number of pens side-to-side and/or back-to-back in generally a grid pattern. The panels are generally hollow and made by vacuum thermoforming, rotational molding, blow molding, or similar processes.

The front panel of such pens is pinned at the corners to the side panels or provided with other fastening means and contains a door that is hinged at one edge and latched to the front panel at the opposite edge. The door may contain an integrated feeding system that holds buckets of feed and water, or possibly a bottle to feed younger animals. These pens must be structurally sound, easy to set up and take down, easy to remove to clean the floor on which they stand, easy to clean, and must provide effective containment of a variety of animals.

In addition, the human user of the pen system may like to set up the pen in a variety of ways, depending upon their operation. Another important aspect of the pens and particularly the raising of young animals like calves is preventing contact between animals in neighboring pens, as such contact promotes the spread of disease. The pen should also function to inhibit cross-contamination of the feed and water that are provided in the pen door.

SUMMARY OF THE INVENTION

The invention in one aspect allows for multiple operating positions for the door in the front panel without the need for secondary or add-on hinges to be attached to the door or door jamb. Incorporating multiple integrated interlocking knuckle locations, which are connected together by a hinge pin passing through the knuckles on the door and jamb, allows for the closing of the opening. Other integrated features allow for a choice of feed opening sizes and also an option for a guard that minimizes feed and water contamination.

The invention also provides a design for an animal pen confinement front with a door with integrated left and right knuckles that interdigitate with corresponding hinge knuckles on the corresponding left or right side of the door jamb so the door can be hinged to the jamb from either the left or right side. The door can also swing either inward or outward. A door stop to facilitate latching of the door can be provided that creates a consistent door stop. In one form this can allow the upper section of a latching mechanism to pin into the frame and lock onto the door. In addition, this allows the lower section of the locking mechanism to securely pin the door and frame together at the bottom of the door to prevent the door from swinging in the door open direction. It also stops the door in the door closing direction when it is latched and makes it easier to find the holes in the door jamb for latching the door to the jamb.

The door stop stops the door in the door closing direction in the closed position of the door to help align the latch with the door or frame. The door stop(s) may be detachable and reversible to be assembled in any of four positions so the door may be hinged left or right, and may swing in or out, using the same door stop(s) for each of the four configurations.

In addition, a pail cross-over guard with an integrated snap-in feature that requires no mechanical fasteners prevents the animal within the pen from feeding and drinking from a single feed opening. This minimizes contamination of materials between the buckets, to keep the water more free of feed and the feed more dry.

In addition, an integrated feed opening restrictor provides for enlarging the feed open area by the user to accommodate larger animals that need a larger feed opening. When present, the restrictor keeps smaller animals from exiting the pen through the feed opening. This provides the ability to keep smaller animals inside the pen and easy modification of the pen to accommodate larger animals that need a larger feed opening by removing the restrictor.

Preferably, both sides of the door and jamb have cooperating latch and catch mounts, stop mounts that provide clearance with the door, alignable hinge holes and a spacer movable to either hinged side of the door that creates a clearance between the door and jamb as the door swings.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
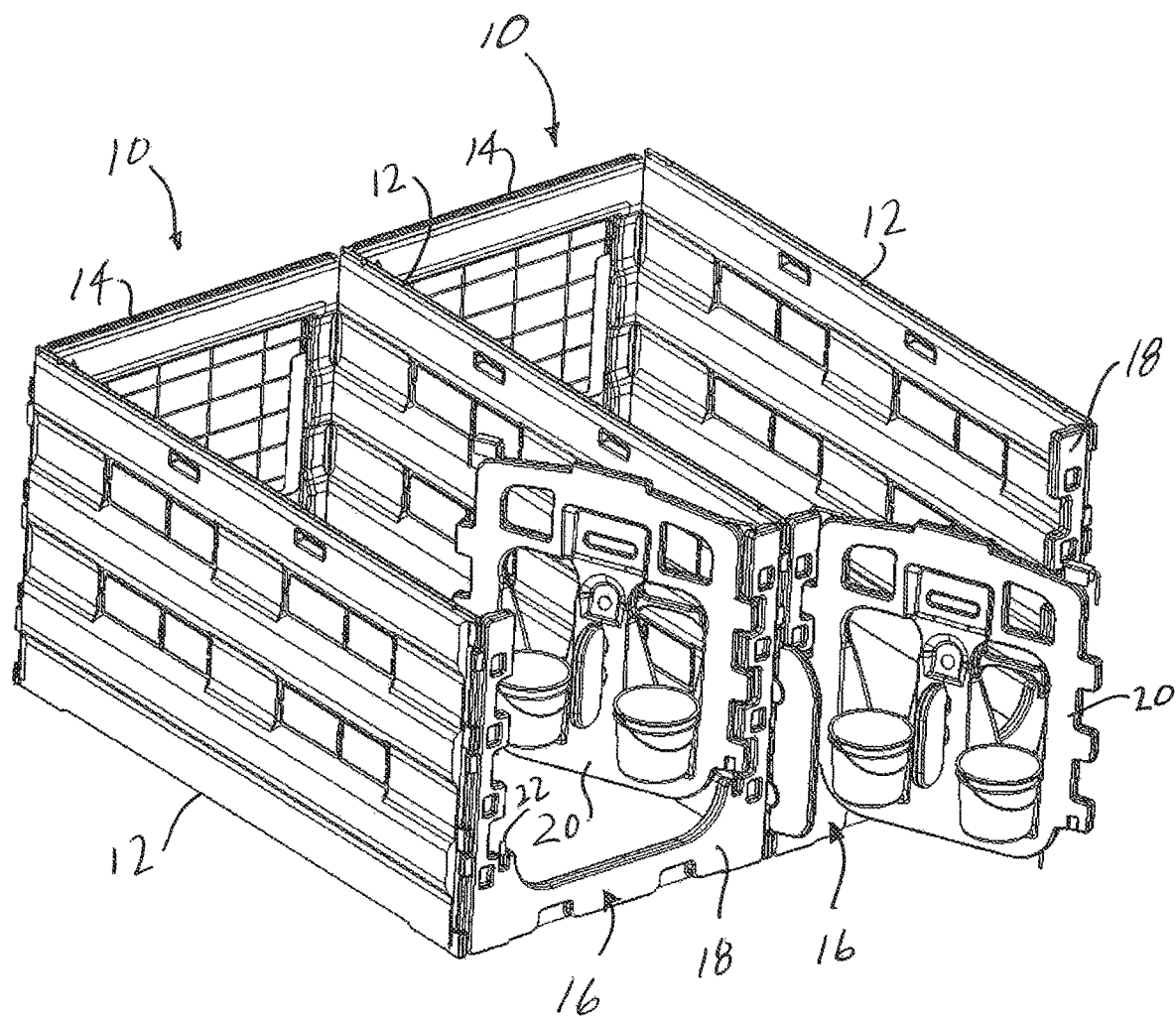
FIG. 1 is a perspective view of two side-by-side pens with the pen on the left set up with the door opening inward and the pen on the right having the door opening outward.
Figure 2:
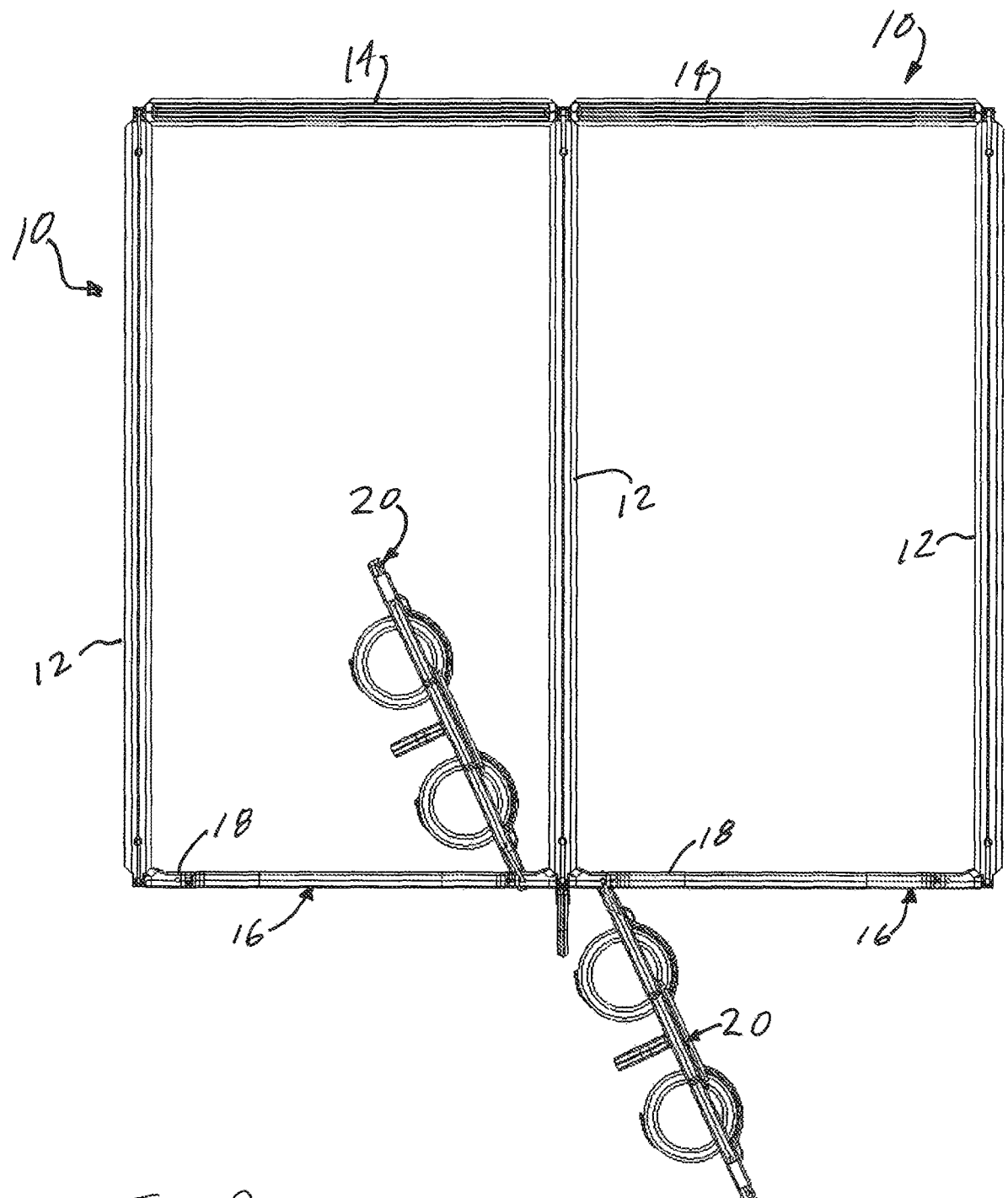
FIG. 2 is a top plan view of the pens of FIG. 1.

Referring to FIGS. 1 and 2, each pen 10 is defined by four panels 12, 12, 14 and 16, with the side panel 12 between the two adjacent pens 10 shared. Thus, each pen 10 has two side panels 12, a rear panel 14, and a front panel 16. The panels are secured to one another at the corners by a rod that extends through interdigitating knuckles of the panels in the manner as described in U.S. Pat. No. 8,186,306, which is hereby incorporated by reference for all purposes. The front panel 16 may also have a steel reinforcement incorporated inside of it as described in U.S. Pat. No. 8,186,306.

Each front panel 16 includes a frame portion or door jamb 18 and a door or gate 20. Each side of the jamb 18 is molded with knuckles 19 and each side of the door 20 is molded with corresponding knuckles 21 that interdigitate with the knuckles 19 molded into the jamb on the same side so that on one side or the other of the jamb a hinge rod 27 can be inserted through holes in the sets of knuckles 19, 21 to extend vertically down through the sets of interdigitating knuckles to create a hinge joint between the door 20 and the jamb 18, on one side or the other. Therefore, the door may be hinged on either the right or the left side. Holes may be provided on both sides of the door and jamb so that the user who assembles the front panel 16 can determine which side to hinge the door to. The hinge rod is J shaped and its short end at the top of the rod is received in a hole at 23 at the top of the door 20 with its long end received in a series of holes down through the knuckles at 44. There is a hole at 23 on both the left and the right of the door. The hole at 23 is used by the latch rod if the latch is installed on that side and is used by the hinge rod on the hinged side of the door. The side the door is not hinged to is the latch side with the latch rod 30 described below, which uses the top hole at 23 in the door on that side. The short end of the latch rod 30 uses the top hole at 44 also. Thereby, sets of holes are provided on both sides of the door and jamb, and both the hinge rod and the latching rod use some of the same holes on opposite sides.

Once hinged, a door stop 22 (FIGS. 1, 6, 7, 8, 9, and 11) is assembled to the door jamb 18 by using screws in the correct position. The door stop 22 helps stop the door in the closed position where the latch rod can be lined up to engage the latch holes in the jamb. Alternatively, the door stop could be fastened to the door. The door stop 22 may be, for example, a piece of galvanized steel and is bent in the shape of a dog leg. It has any of four positions, two positions (inside or outside) on each side of the door opening of the jamb. It may be screwed to the jamb either from the outside of the jamb or from the inside of the jamb. If screwed on the outside of the jamb, the door will open outwardly, and if screwed on the inside of the jamb, the door will open inwardly. As stated earlier, the four positions would be left inward or outward and right inward or outward. The door stop 22 is in all four positions received in a recess in the door jamb and is screwed to a web of plastic 24 that spans the recess. The part of the door stop that does not have mounting holes and extends upwardly is received in a recess of the door that is spanned by a web of plastic 26 (FIG. 7).

Figure 11:
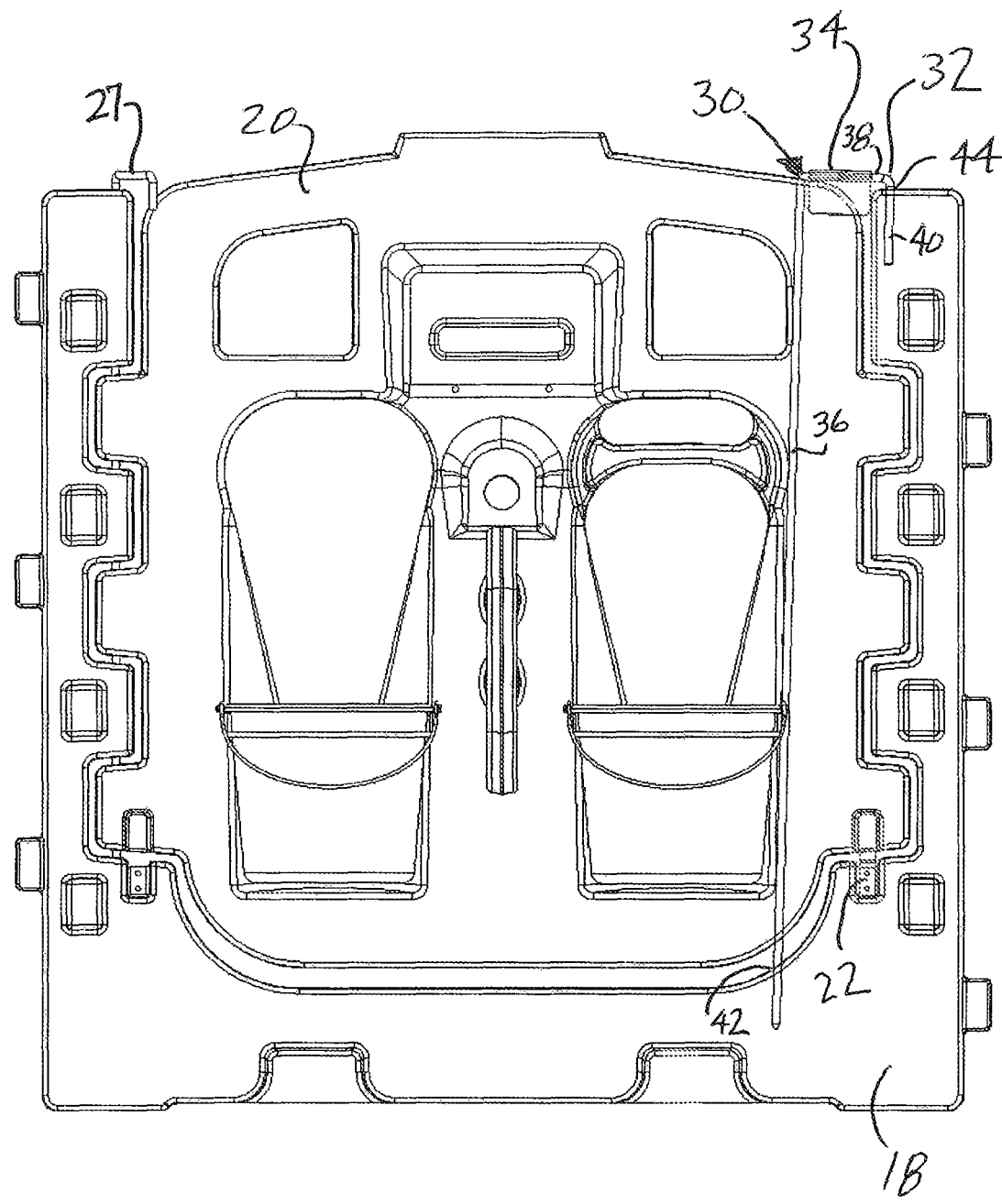
FIG. 11 is a plan view of the pen front showing how the door latch rod extends through the door with a top leg extending through the door jamb and a bottom end extending into the bottom of the door jamb and showing on the opposite side the hinge rod with its short end disengaged from the door.
Figure 12:
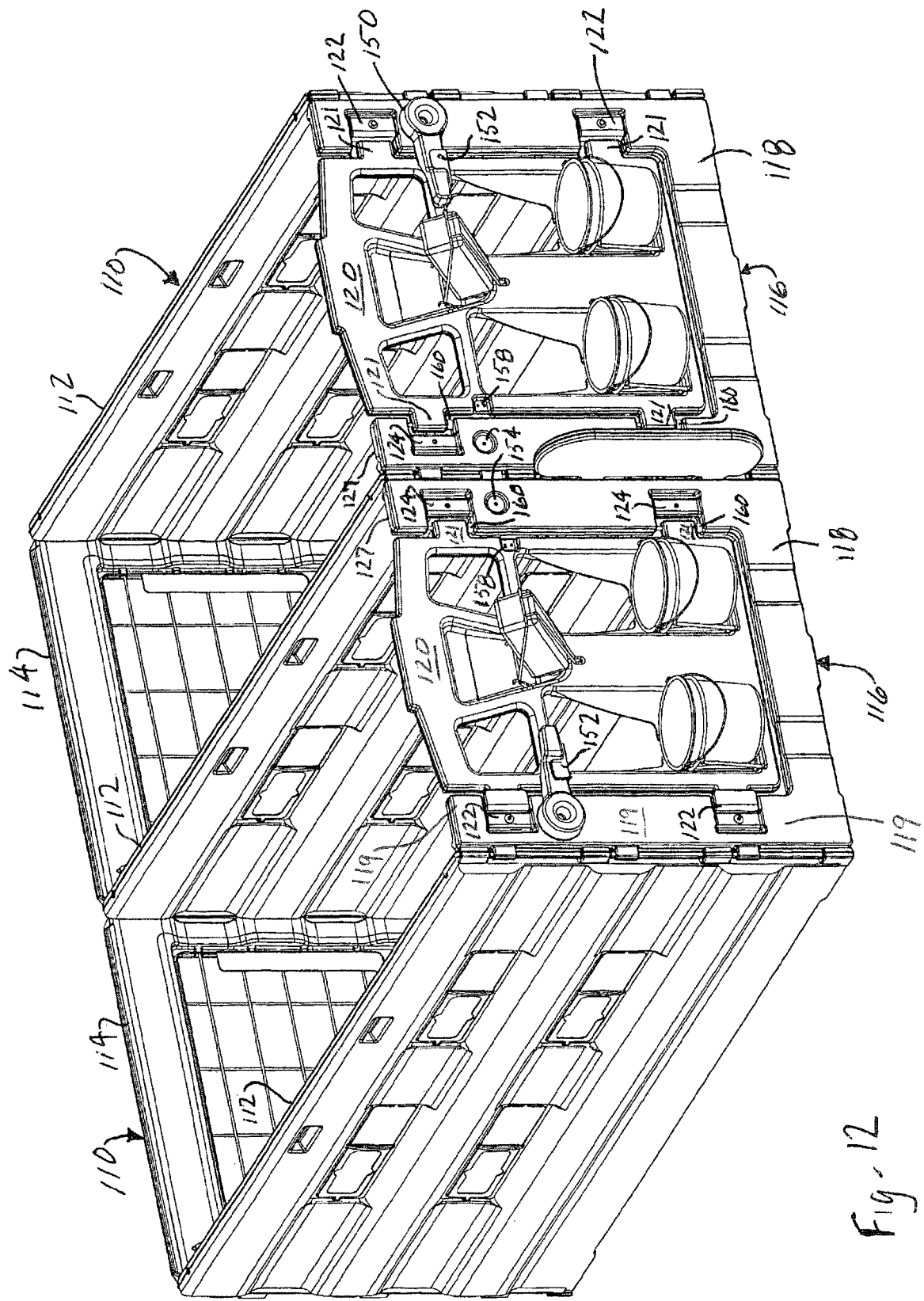
FIG. 12 is a view like FIG. 1 but of a second embodiment of the invention, shown with the doors closed.
Figure 13:
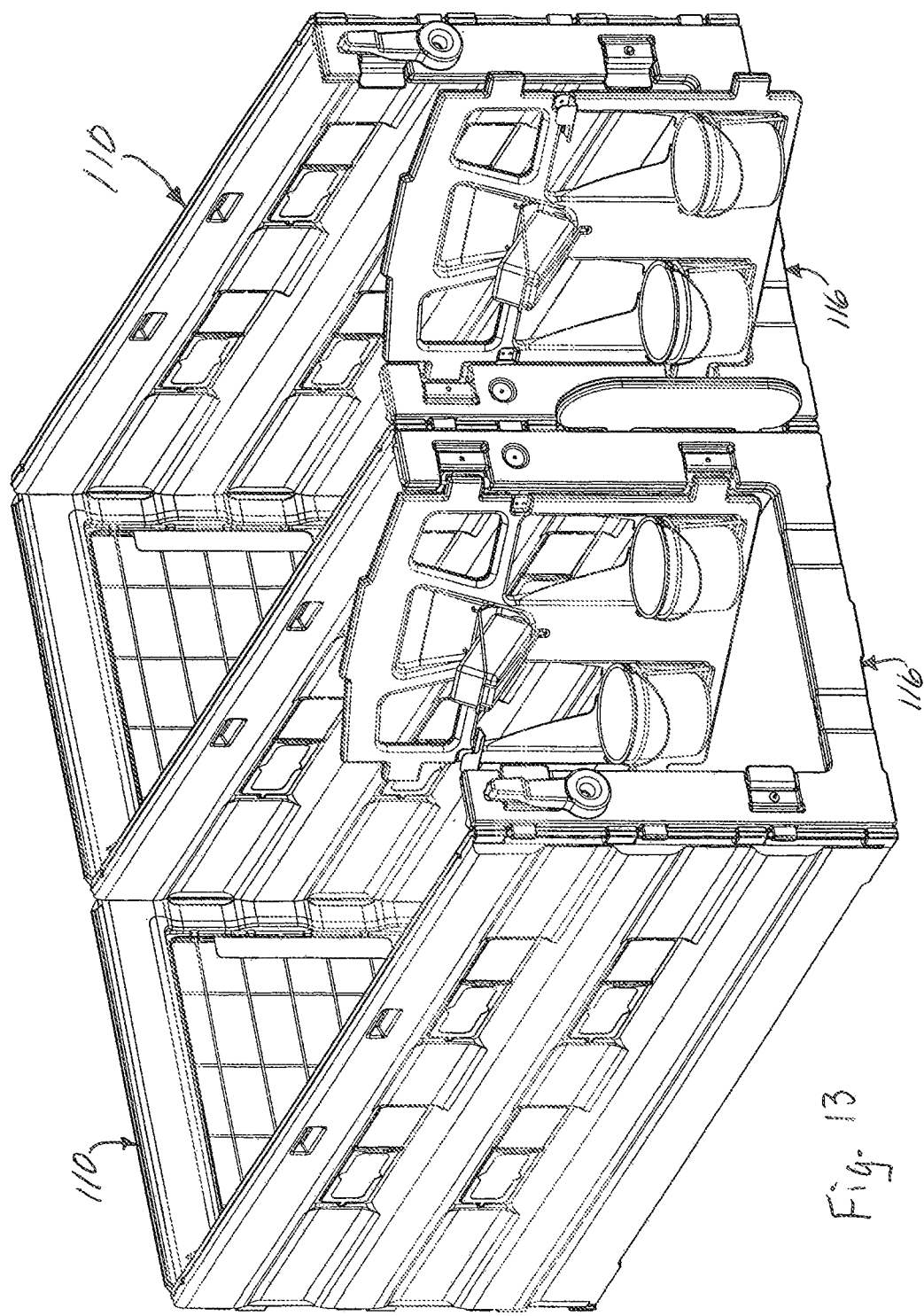
FIG. 13 is a view like FIG. 12 with the left door hinged at the right side and opening inward and the right door hinged at the left side and opening outward.
Figure 14:
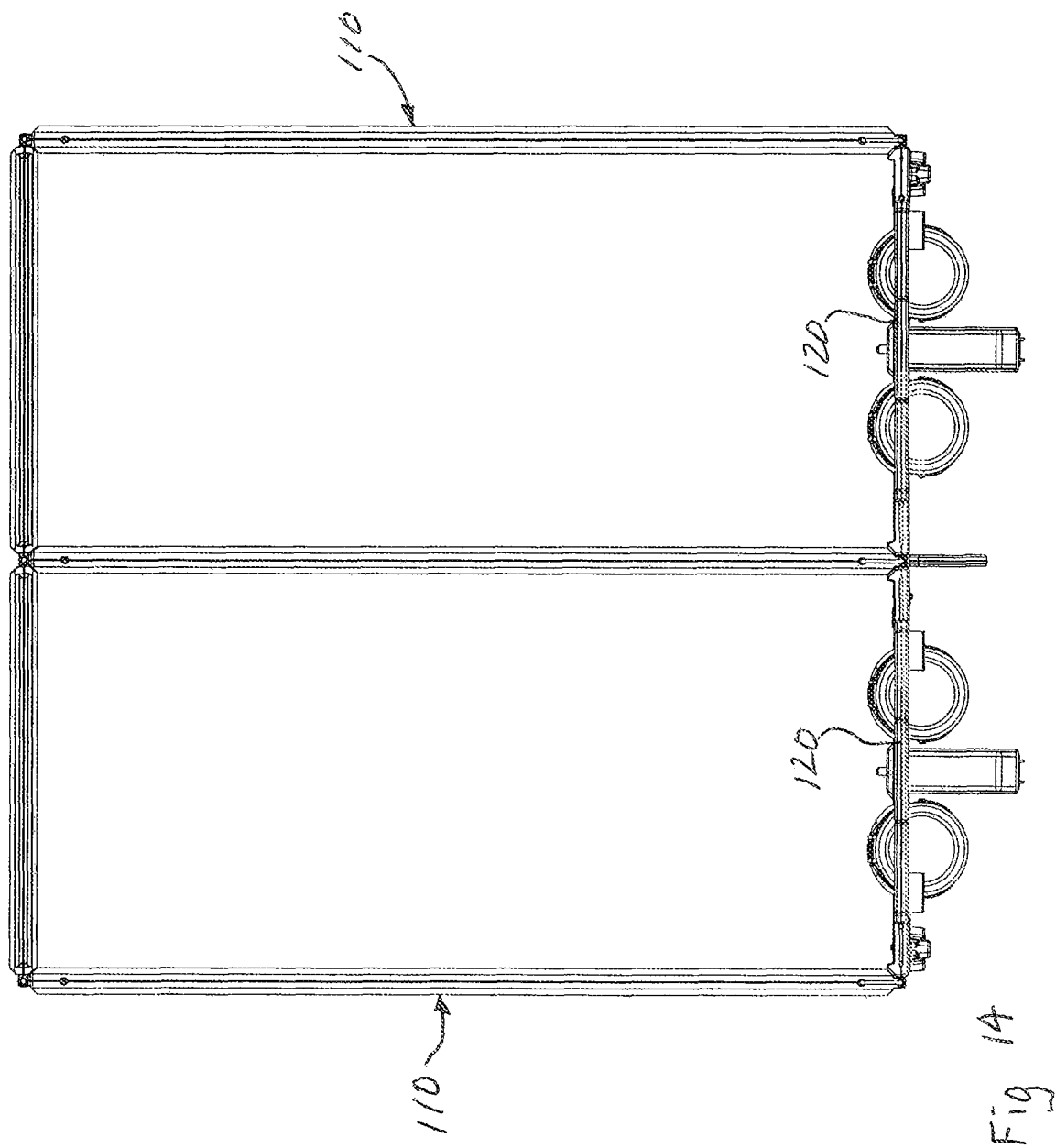
FIG. 14 is a top plan view of the second embodiment as shown in FIG. 12.
Figure 15:
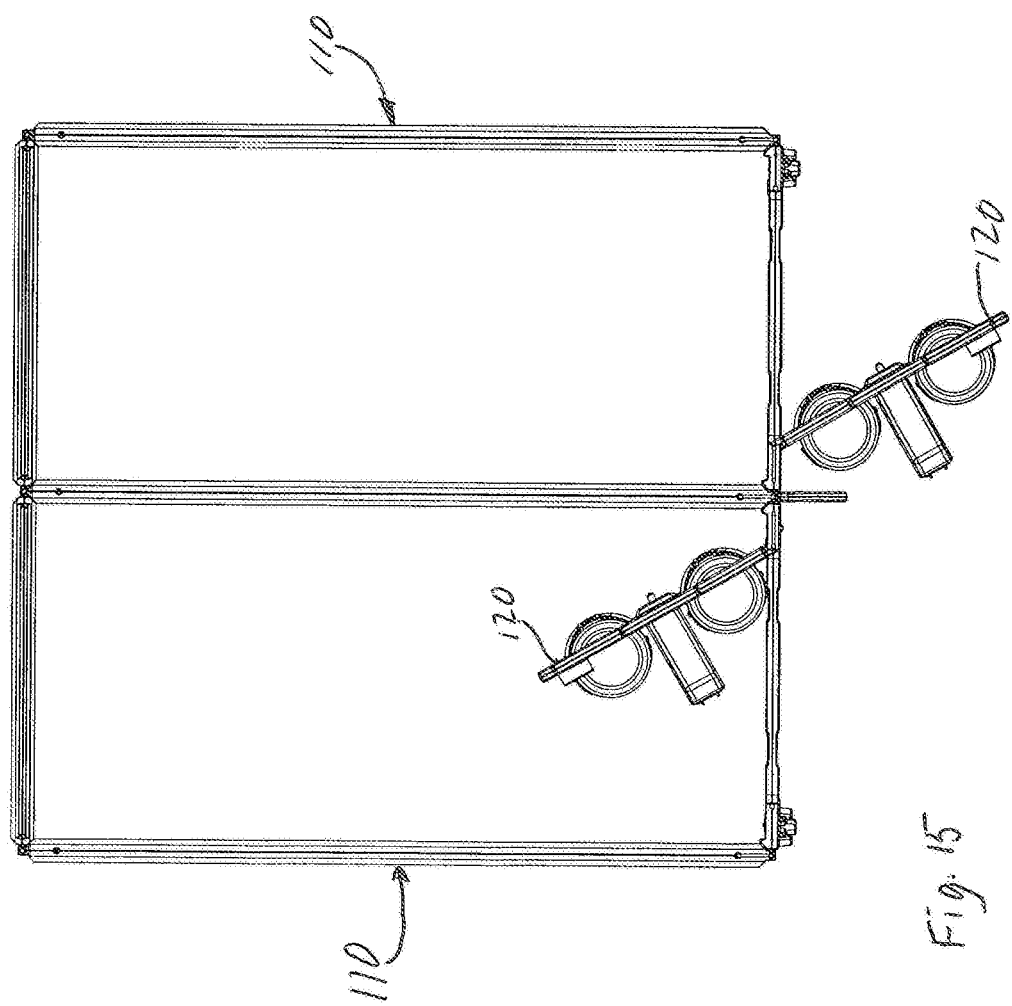
FIG. 15 is a top plan view of the second embodiment as shown in FIG. 13.
Figure 16:
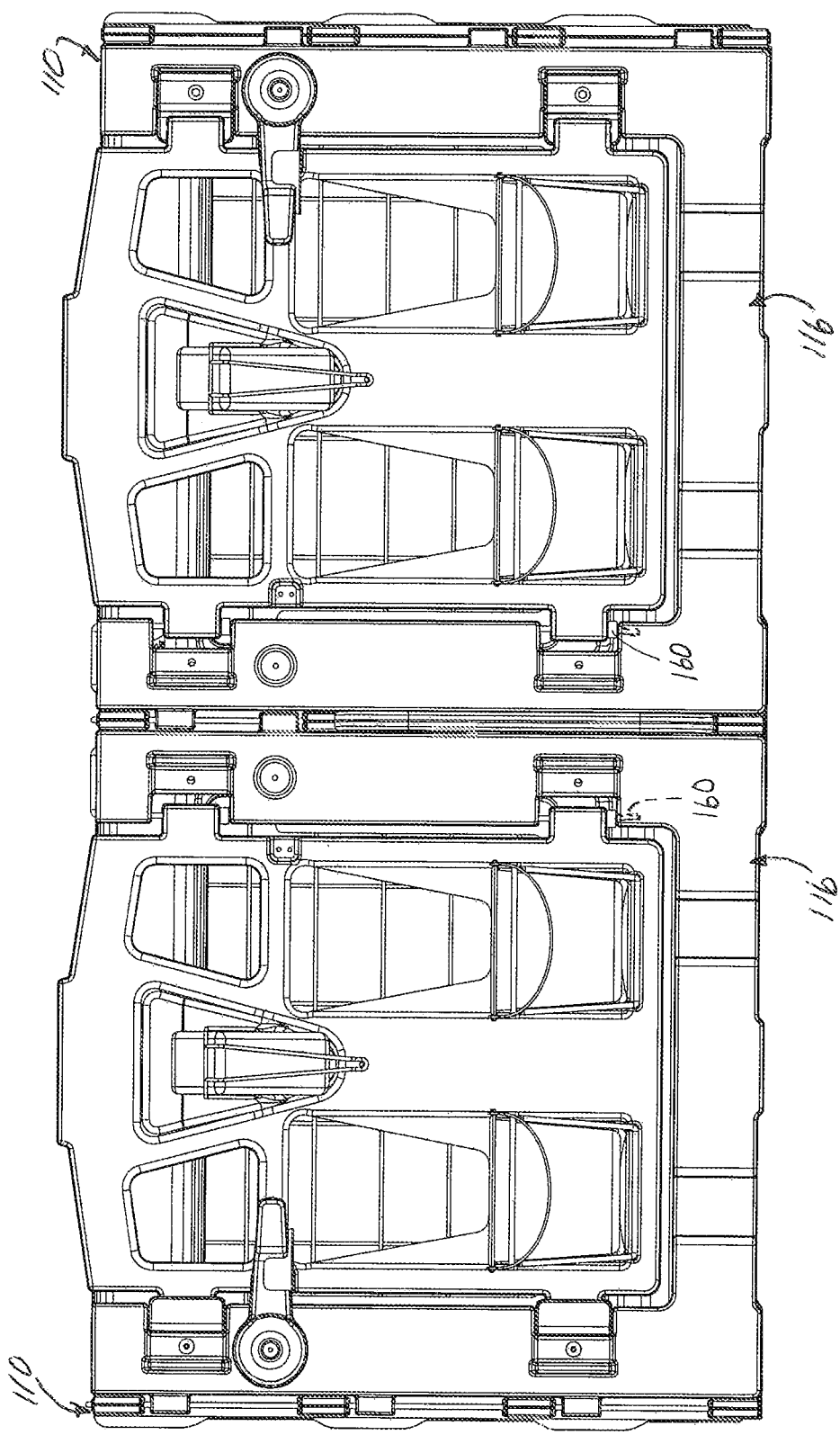
FIG. 16 is a front plan view of the second embodiment.
Figure 17:
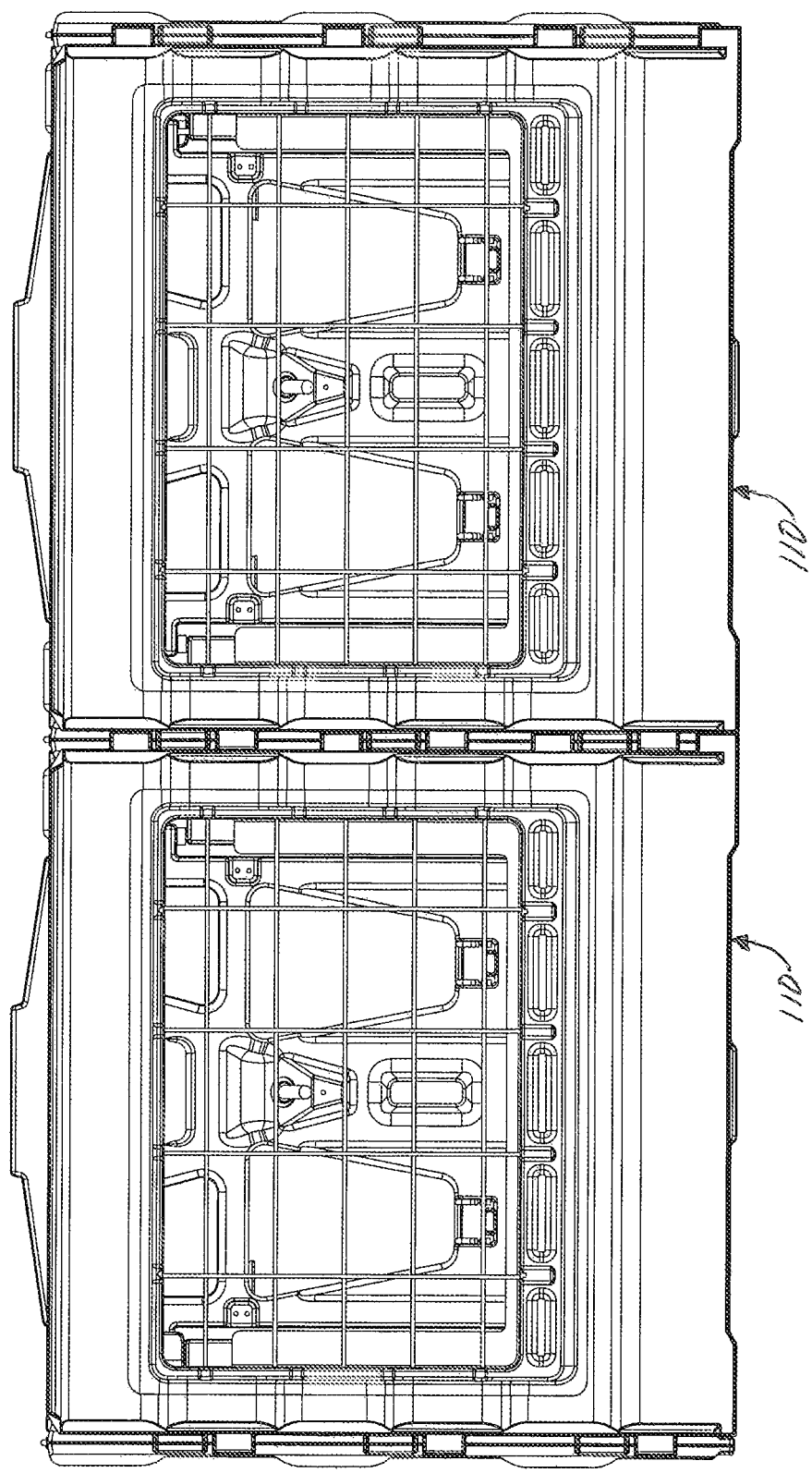
FIG. 17 is a rear plan view of the second embodiment.
Figure 18:
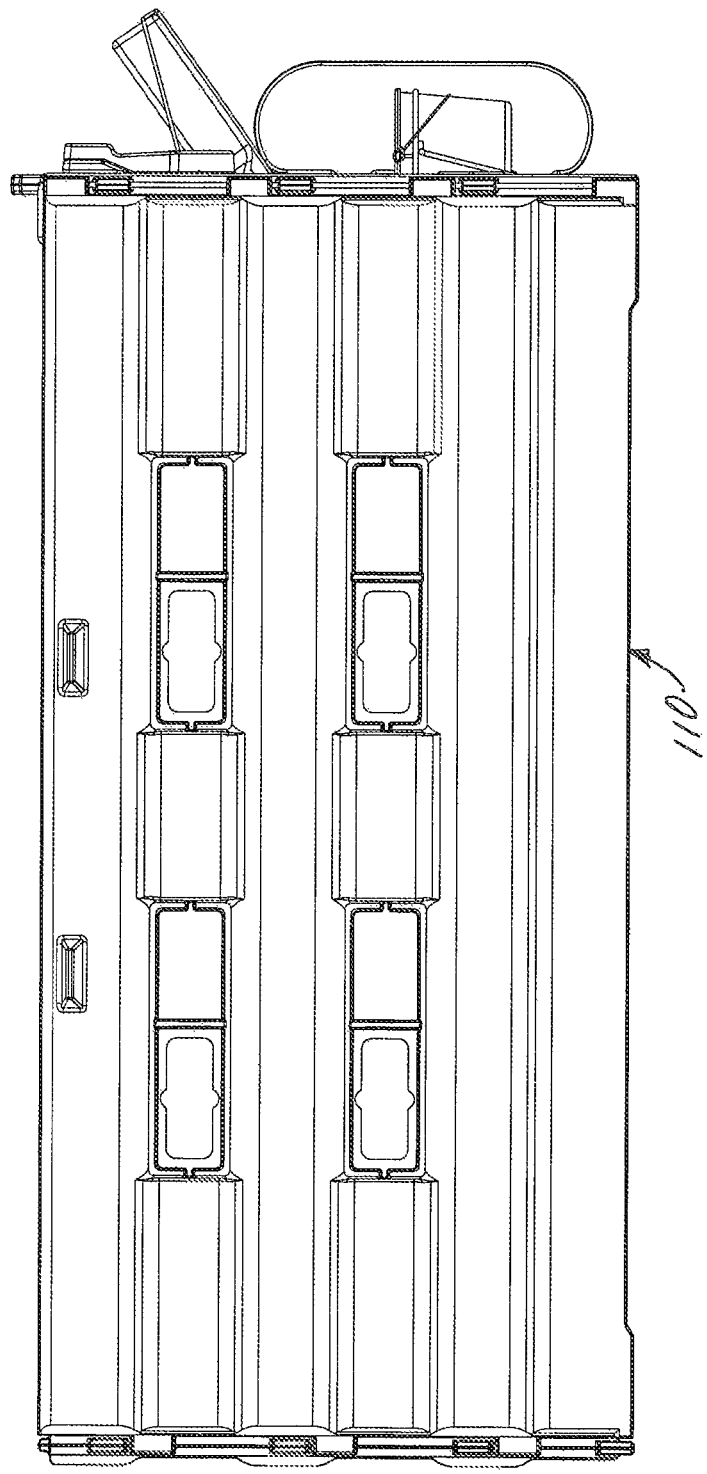
FIG. 18 is a left side plan view of the second embodiment.
Figure 19:
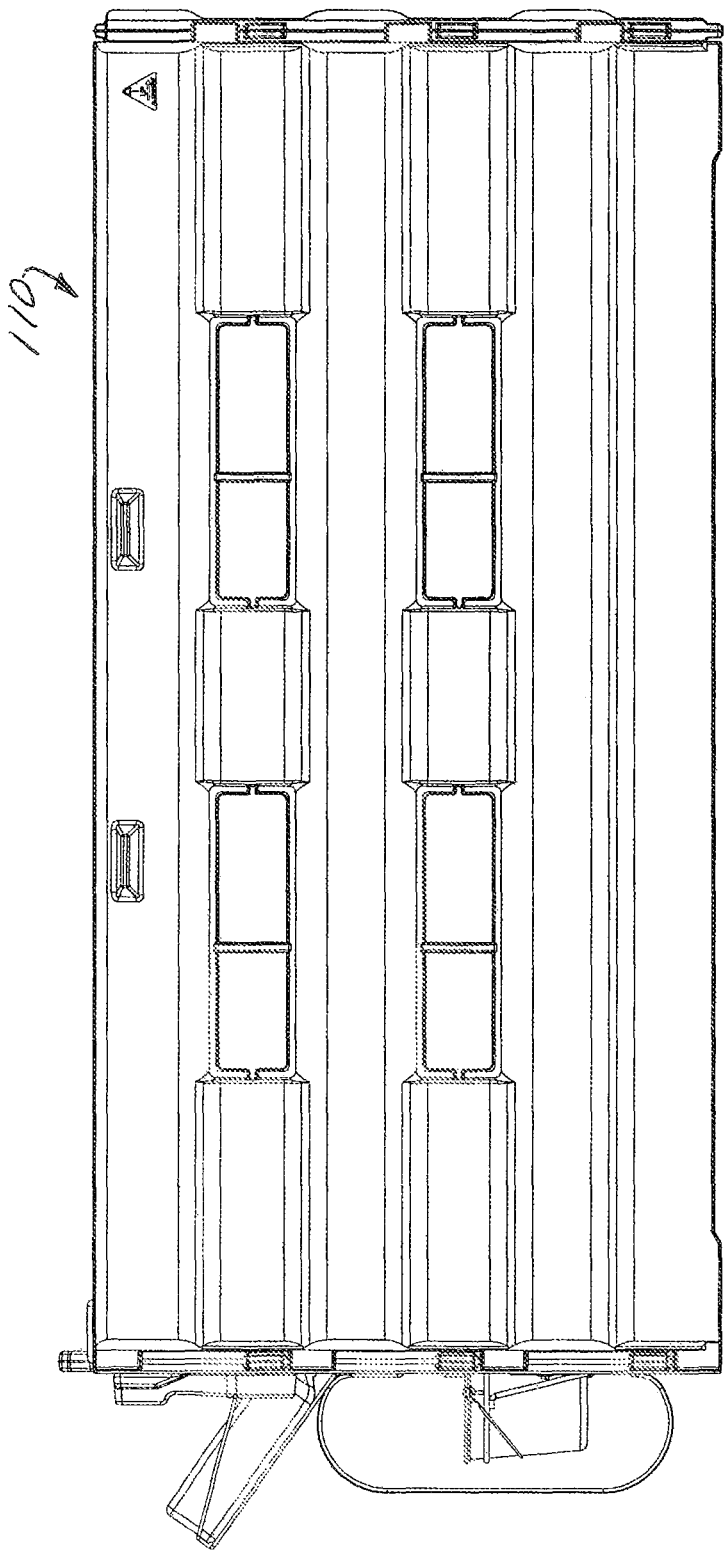
FIG. 19 is a right side plan view of the second embodiment.

When the door 20 is closed against the stop 22, a latching mechanism 30 is employed that locks the door shut to the door jamb 18. Referring to FIG. 11, as described in part above, the latching mechanism 30 includes an upside-down J-shaped latching rod 32. The rod 32 has a U-shaped keeper 34 welded or otherwise affixed to it. The rod 32 may be steel and the keeper 34 may be sheet steel. The rod 32 has a long end 36, a cross run 38 to which the keeper 34 is attached, and a short end 40. In the position shown in FIG. 11, the lower end of the long end 36 extends into a hole in the bottom part of the jamb 18 at 42 and the short end 40 extends into the hole at 44 in the top of the jamb 18. The long end 36 extends through the door 20 for substantially its full height and is guided therein by the door 20. Guides may be molded into the door 20, or the entry and exit holes provided at the top and bottom of the door 20 for the long end 36 may be adequate in themselves. In the position shown in FIG. 11, the U-shaped keeper 34 extends down and overlaps both sides of the door 20, so that the door 20 is between the vertical sides of the keeper 34. This forms a U-shaped yoke that cradles the top of the door and keeps the rod 32 from rotating substantially relative to the door 20 so that the short end 40 is fixed to the door 20 to keep it from swinging in or out when the latch is secured. The keeper 34 also provides a handle to lift the latching rod 32 and open or close the door.

When it is desired to open the door 20, the user grabs the keeper 34, lifts it until the end of the short end 40 clears the top of the jamb 18 which is at about the same point that the bottom of the long end 36 clears the hole 42 in the jamb. The user is then free to open the door either inward or outward, depending upon where the door stop 22 is assembled, either on the inside of the door or on the outside of the door.

Figure 3:
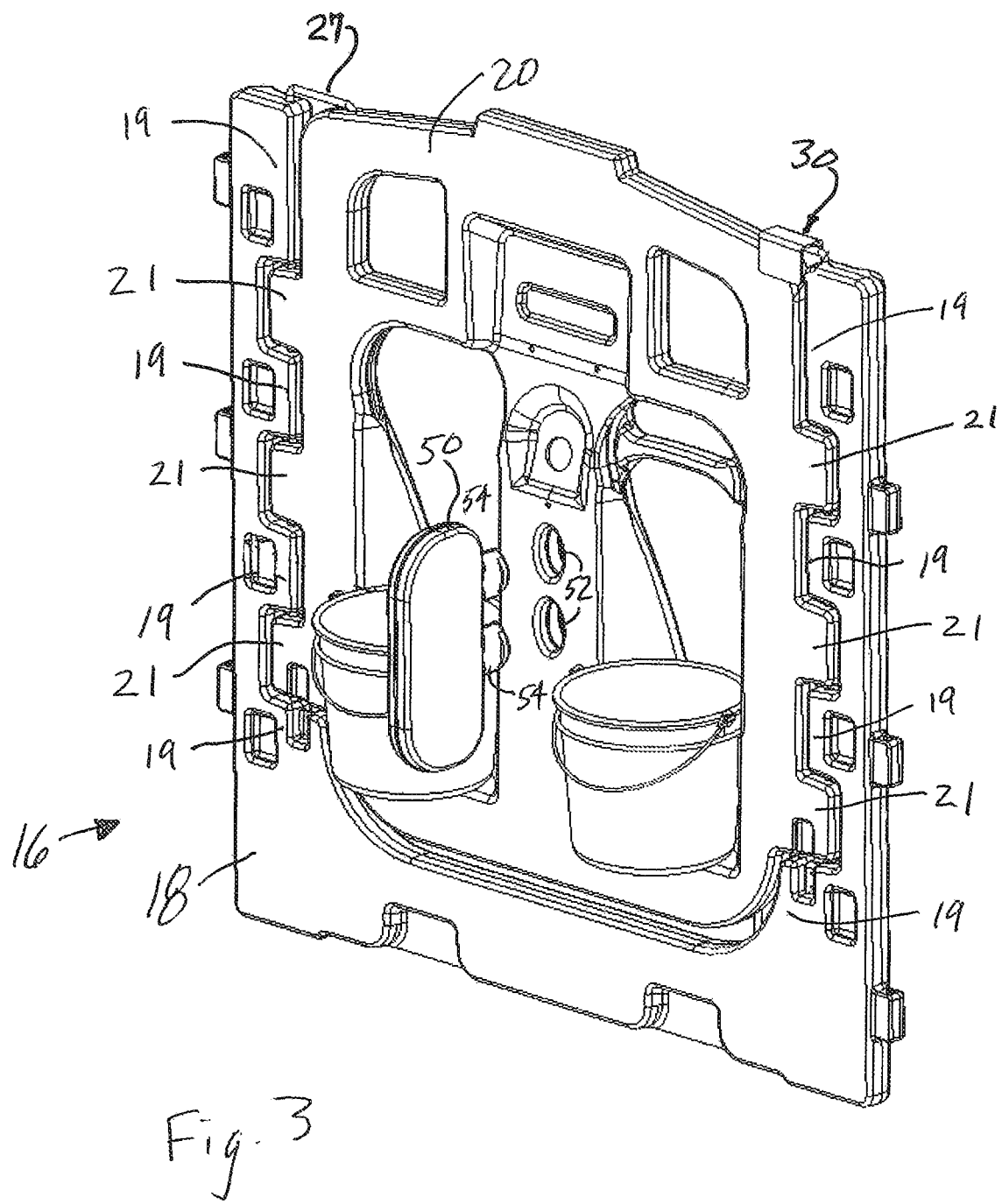
FIG. 3 is a perspective view of one of the pen fronts of FIGS. 1 and 2 shown alone and with a pail cross-over guard shown exploded off from the door.
Figure 4:
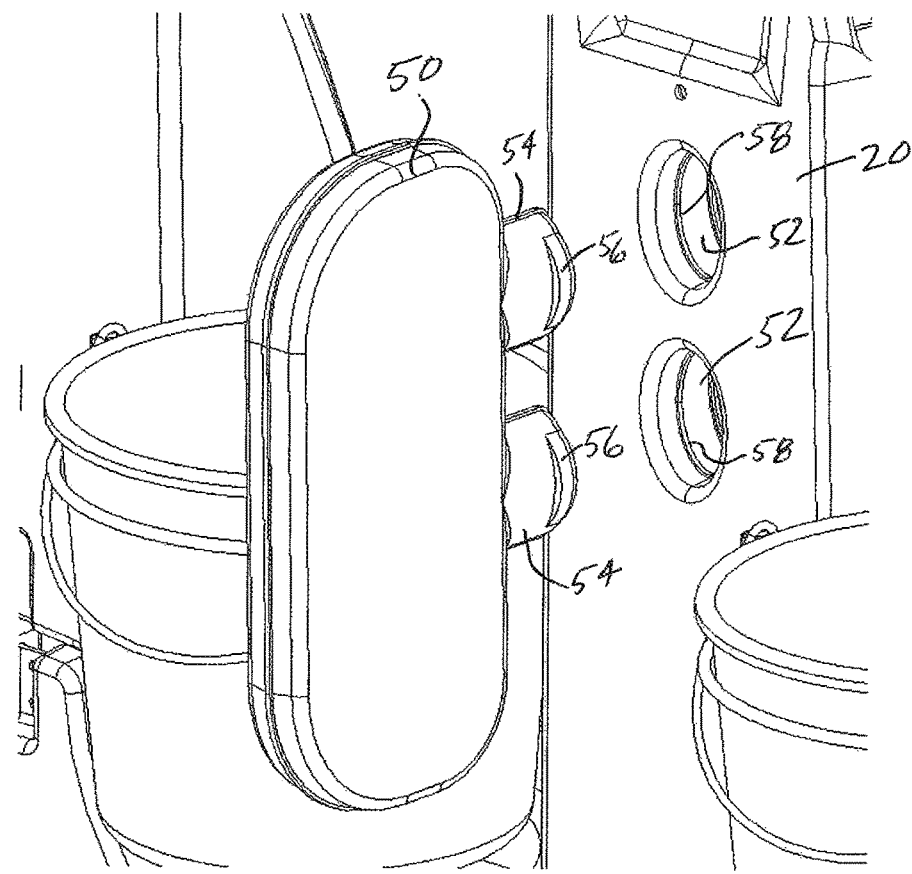
FIG. 4 is a detail perspective view of a portion of FIG. 3.
Figure 5:
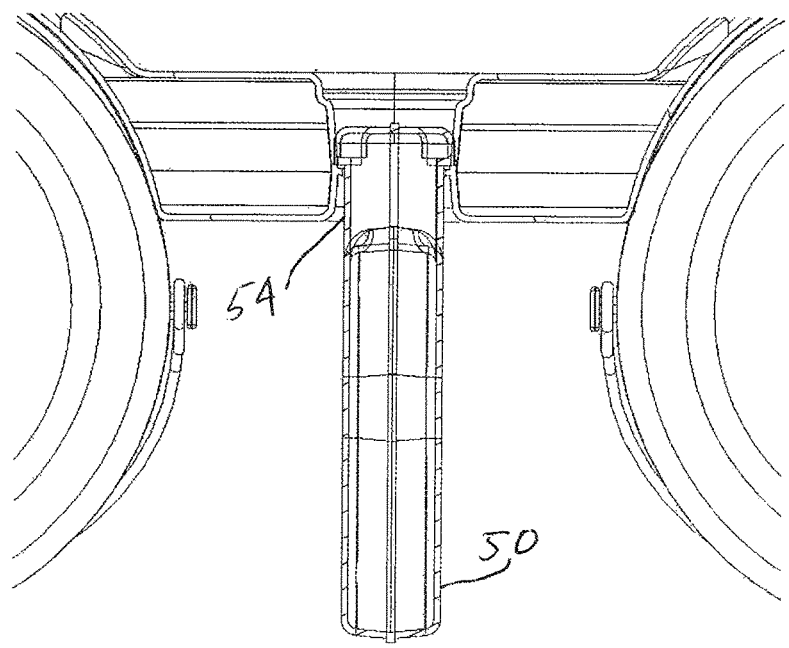
FIG. 5 is a cross-sectional view showing the cross-over guard assembled to the door.

Referring particularly to FIGS. 3-5, a cross-over guard 50 is provided that snaps into holes 52 in the door 20. It is also hollow plastic and may be molded using methods similar to the methods used to mold the panels. No mechanical fasteners are required to attach the guard 50 to the door 20. The guard 50 has studs 54 molded integrally with it that have ears 56 on opposite sides that snap into the holes 52 and resist removal of the guard 50 from the holes 52. When installed, the cross-over guard prevents an animal from feeding and drinking from a single feed opening in the door, which minimizes water contamination when moving from the feed pail to the water pail and keeps the food more dry when moving in the opposite direction. As shown in FIGS. 4 and 5, the holes 52 may be molded with an axially-facing shoulder 58 that catches on the back of the ears 56 to retain the guard 50 to the door 20.

Figure 6:
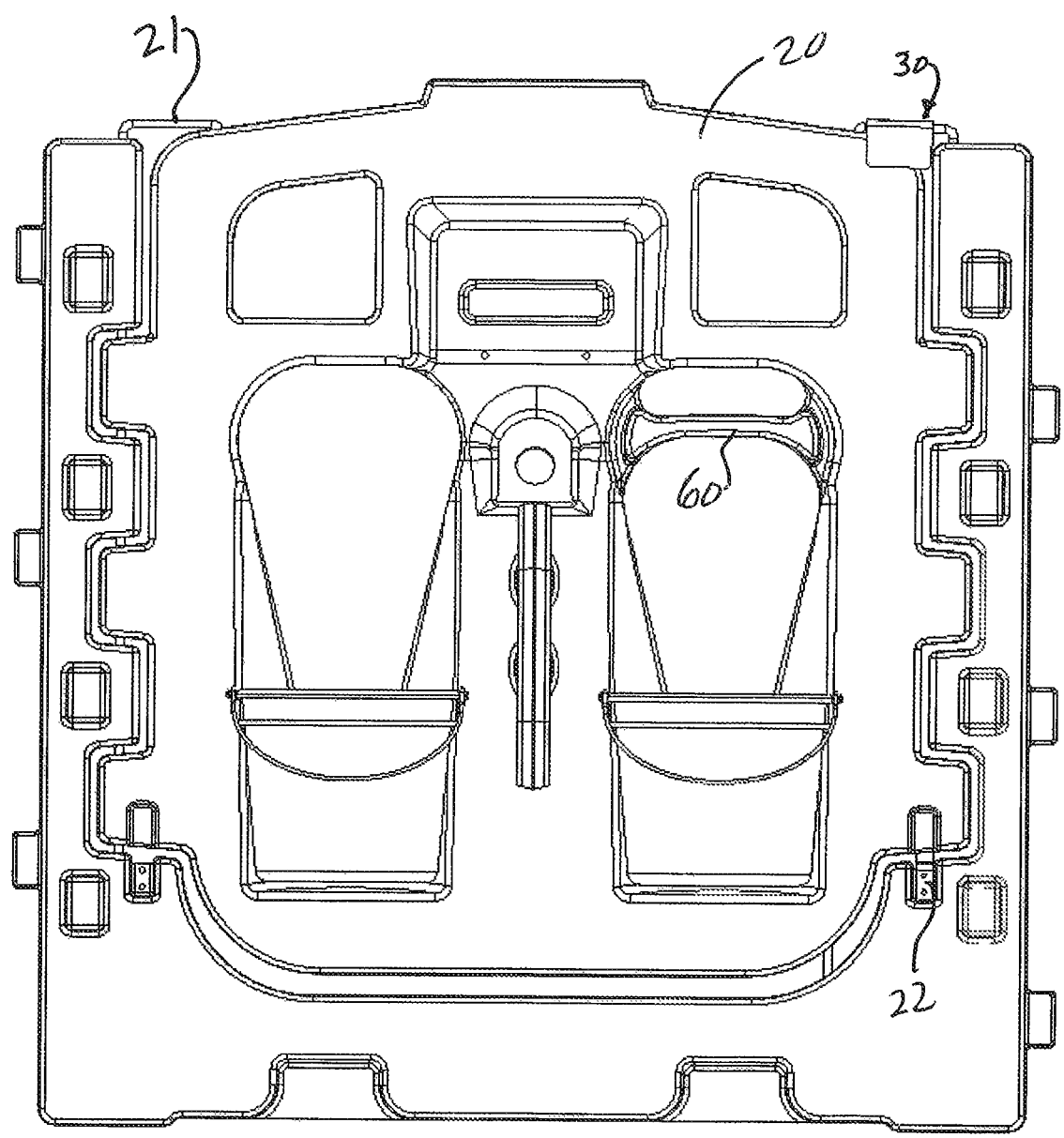
FIG. 6 is a front plan view of the pen front with a feed restrictor shown in the feed opening on the right and the opening on the left shown without a feed restrictor.
Figure 7:
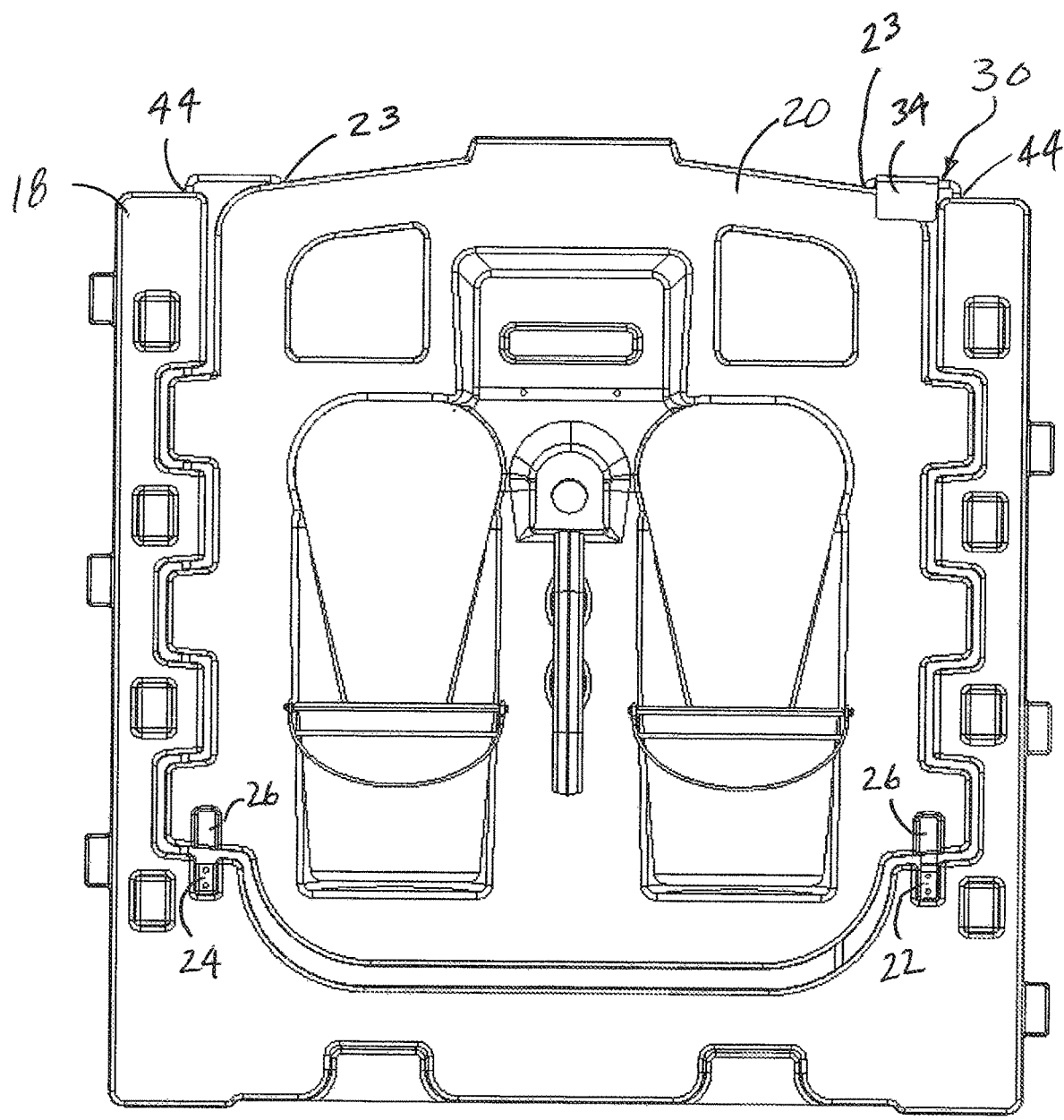
FIG. 7 is a view like FIG. 6 with both feed restrictors removed.
Figure 8:
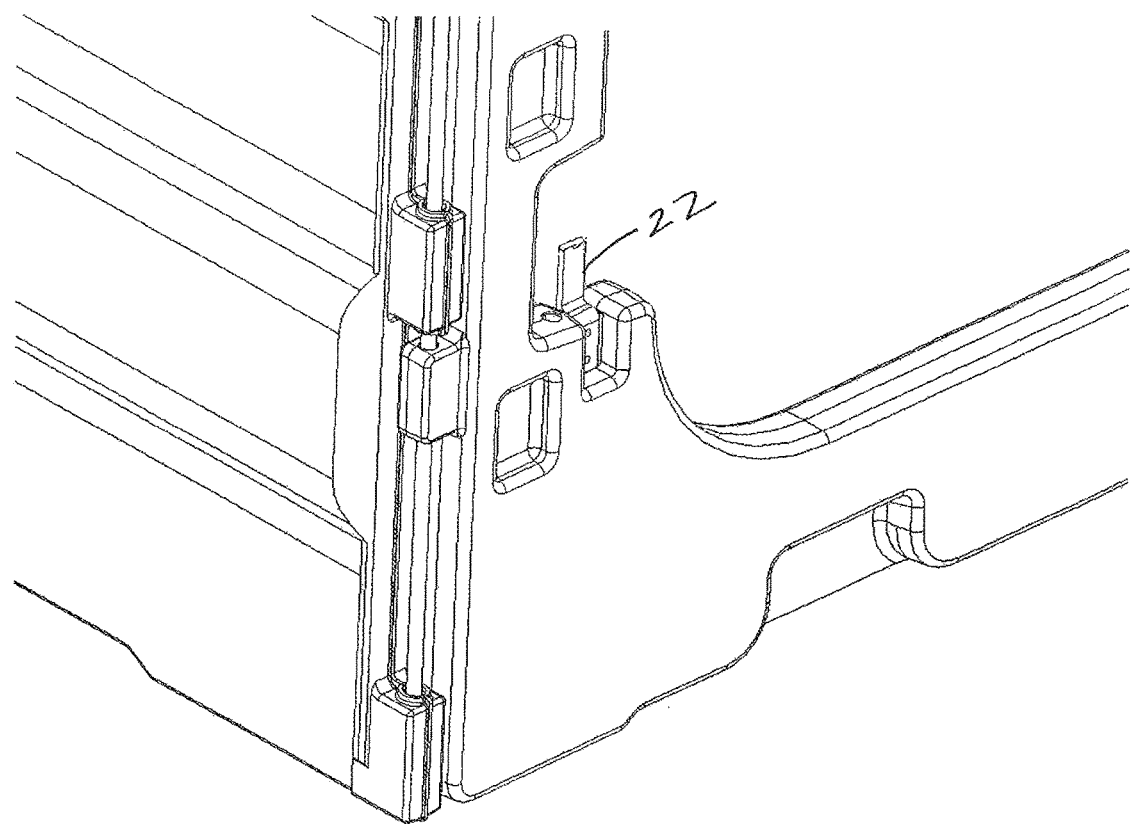
FIG. 8 is a perspective view illustrating a door stop assembled to the pen front in a position to stop a door that opens outwardly (closes inwardly)
Figure 9:
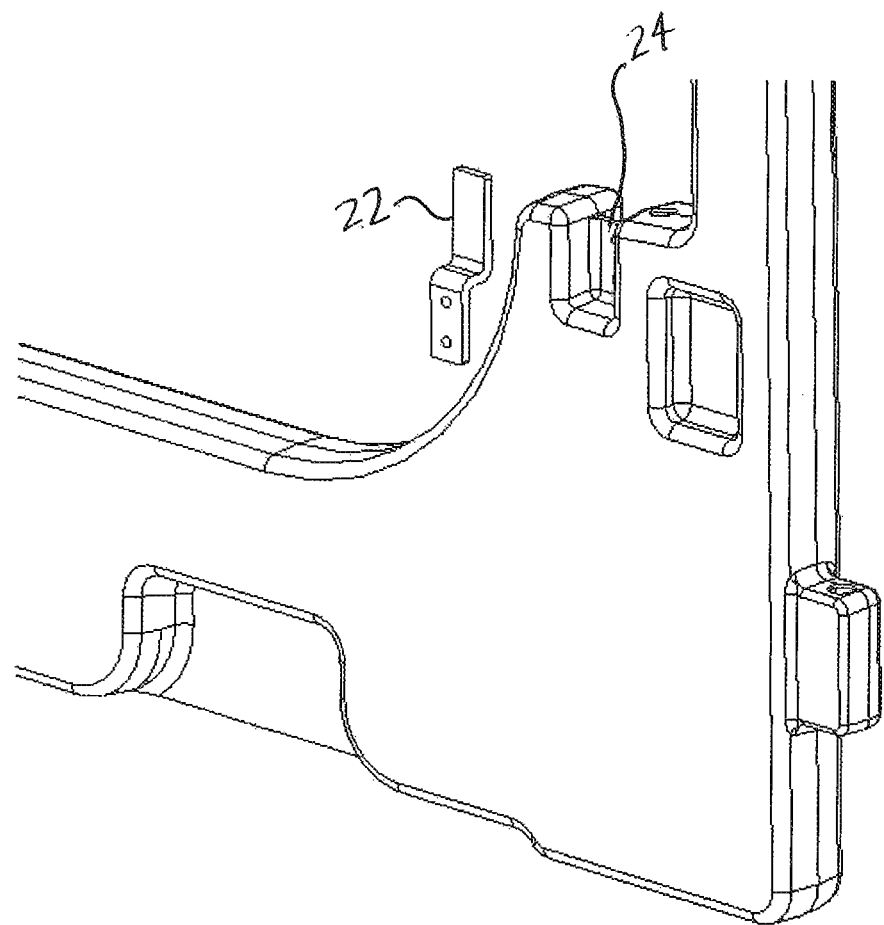
FIG. 9 is a view showing the door stop as it would be assembled to the opposite side of the pen front and with the door stop exploded off from the pen front panel.
Figure 10:
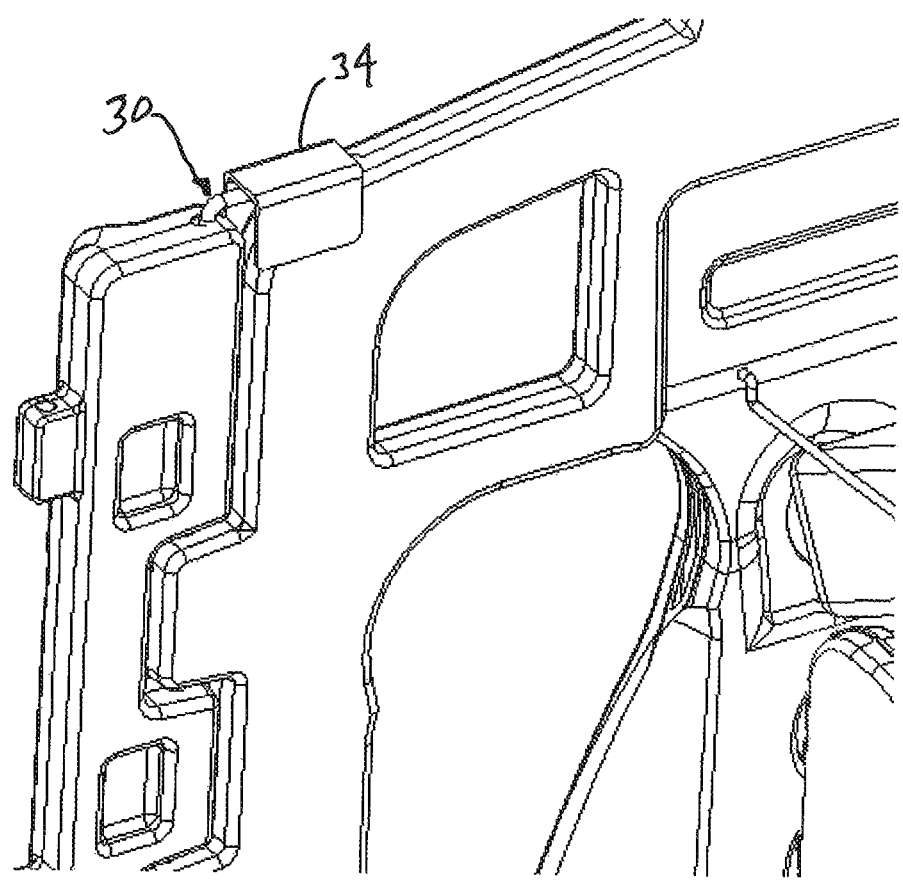
FIG. 10 is a view showing the top part of the door latch.

Referring to FIG. 6, the door 20 is illustrated on the right side feed opening with a feed opening restrictor 60. The restrictor 60 is molded into the door 20 and when present, restricts the size of the feed opening so smaller animals, like small calves or goats, cannot exit the pen through the feed opening. For larger animals, like older calves, that may require a larger feed opening, the restrictor 60 is cut along its outside edges so that the opening looks like the left-hand side opening shown in FIG. 6. When new and delivered, the restrictor would be in both openings as is shown on the right side and after both restrictors are cut out, both openings would look like the opening on the left in FIG. 6. The area of the cut is preferably pinched off and welded so the two sides of the panel are welded together in that area, with no space between them. That creates a single edge of a single thickness with no hollow space between the two sides of the door when the cut is made.

Thus, in one aspect, the invention provides a molded plastic pen front in which both sides of the door and door jamb are provided with interdigitating knuckles through which a rod may be inserted so that the hinge is on either side of the door. The hinge rod may be J-shaped with the long part of the rod extending through the knuckles and the short free end of the rod extending into a hole in the upper side or surface edge of the door. Preferably, the same sets of holes, or at least some of them, are used for the hinge rod and the latching rod, on opposite sides of the door. In addition, a door stop may be provided having any of multiple positions so that the same door stop can be used regardless of which side of the door is hinged to the door jamb and the door stop may be used regardless of whether the door is configured to swing in or swing out. The latching mechanism includes a J-shaped latching rod that secures the door both at the top and at the bottom. The rod may include a U-shaped keeper that extends on both sides of the front so that the rod is substantially restrained against pivoting when the latching rod is latched. In addition, the feed openings in the pen front may be provided with a restrictor that keeps small animals from exiting the pen through the feed opening, but can be removed to accommodate larger animals for feeding. In addition, the pen front preferably includes a cross-over guard that can be snapped in to prevent an animal from accessing two buckets from one opening.

Modifications will occur to persons of ordinary skill in the art that still incorporate the invention. For example, the U-channel keeper 34 that latches the door 20 could be integrally molded or attached to the top of the door 20 rather than mounted to the J-rod 30. Such a configuration would help hold the rod 30 from rotating relative to the door 20 to reduce play in the latching of the door and may be preferable, particularly if molded in. It would also be possible to eliminate the door stop, allowing the door to swing either way, albeit it would make it more difficult to find the upper and lower holes to latch the door. It is also not necessary to have the door stop be doglegged or in recesses.

Another embodiment 116 of a 6-way pen front panel is shown in FIGS. 12-19. Similar elements are labeled in the pen 110 with the same reference number as in the first embodiment 10, plus 100.

The six ways the door 120 (or door 20) can be configured are:
1) Left hinged, swings out
2) Left hinged, swings in
3) Left hinged, swings in or out.
4) Right hinged, swings out
5) Right hinged, swings in
6) Right hinged, swings in or out.

In the pen front 116, there are two door stops 122 on the side of the jamb that opens that are reversible or can be left off to provide the six ways. Illustrated are two reversible stops on either the right of the jamb 118 (right pen in FIG. 12) or the left of the jamb 118 (left pen in FIG. 12). The dog-leg-shaped stops 122, secured with a screw or bolt along one edge of the jamb, are reversed between the inner or the outer surface of the web 124 to change the door from swinging in to swinging out, and are removed to permit the door to swing both ways. If the stops 122 are removed, the pivoting latch handle 150 positions and secures the door, latching into a channel-shaped receiver catch 152 affixed to the door. The rotary latch handle 150 and its accompanying receiver 152 stops the door from swinging in or out if the door stops are removed or the door is set to swing either in or out only. The handle 150 is secured in a recess 154 of the jamb with a fastener (e.g., a bolt or screw, to swing about the axis of the bolt), and there is one recess 154 provided on each side of the jamb for the purpose of mounting the handle 150. A J-shaped rod 127 extends through the interdigitating two knuckles 121 of the door and three knuckles 119 of the jamb, on the left side or right side, to provide the hinge axis for the door 120. The two knuckles 121 on the opposite side of the door are received in the open spaces at the edge of the web 124 and each abuts a stop 122, so the knuckle is bordered on four sides (top, bottom, inside and free end), providing additional stability.

The door stops 122 and handle 150 may be thermoformed plastic and the catch channel 152 may be formed of metal. The webs of plastic 124 form recesses at each of the four locations per pen front where a stop 122 may be fastened with a screw or bolt. These webs of plastic are recessed inwardly from the front surface and also are recessed outwardly, either rightwardly or leftwardly, from the inner edge of the jamb 118 to create an open space between the free edge of the web 124 and the free inner edge of the jamb 118. This allows the door knuckles 121 on the hinged side of the door 120 to extend into that space and be engaged by the J-shaped hinge rod 127 to create the hinge of the door 120 to the jamb 118. Also, those spaces on the opposite side let the knuckles 121 swing through them so the door can open both ways if no stop 122 is present, and can be made to open one way or the other with selective assembly of the stop 122 on either the inner or the outer side of the web 124. Recessed mounting pads 158 are also provided at each of the two locations per panel 116 at which a catch 152 can be fastened with fasteners such as screws or bolts.

With the knuckled configuration of the door, there are many ways that reversible/removable stops can be attached or utilized. Making the door with knuckles permits each tab to function as either a hinge knuckle or one of the two required components of a stop. The reversible and removable stops could be affixed to either the jamb or to the door. Also, a different number of knuckles, e.g., three or four, could be provided along each edge of the door instead of two as in the illustrated embodiment, with corresponding knuckles in the jamb and each edge of the door and jamb need not necessarily have the same number of knuckles.

Although not illustrated, a pail cross-over guard could also be incorporated into the pen front 116. A construction could be provided whereby the guard could be attached to the door between the feed openings with fasteners such as screws or bolts.

In addition, shouldered spacer bushings 160 can be provided between the hinge rod 127 and the holes in the jamb 118 through which the rod 127 extends. Each bushing spacer 160 is shouldered, being mushroom shaped with an enlarged head that resides between the bottom side of each knuckle 160 and the jamb 118 and a shank that extends from the head into the adjacent hole in the jamb 118 with the rod 127 inside the hole that runs through the bushing 160, The shoulder is therefore between the head and the shank. The spacers 160 are moveable to the chosen hinged side of the door, either right or left of the door, and raise the hinged side of the door so that the door clears the frame as it swings.

Preferred embodiments of the invention have been described in considerable detail. Many modifications and variations to the preferred embodiments described will be apparent to a person of ordinary skill in the art. Therefore, the invention should not be limited to the embodiments described.

We claim:

1. A molded plastic pen front including a door jamb and a door wherein both sides of the door and door jamb have interdigitating knuckles through which a rod can be inserted to create a hinge joint on either side of the door, further comprising a door stop configured to be assembled to the pen front and received in a recess of the jamb opposite the hinge joint whether the door is hinged on one side or the other and whether the door swings in or swings out.

2. A pen front as claimed in claim 1, wherein the door can be configured to swing in or swing out.

3. A pen front as claimed in claim 1, wherein the door stop is dog leg shaped.

4. A pen front as claimed in claim 1, wherein the door stop is secured to a web of plastic in the recess of the jamb and abuts against the door when the door is closed.

5. A pen front as claimed in claim 1, wherein the door stop is removable and reversible.

6. A pen front as claimed in claim 1 wherein there are two knuckles on each side edge of the door and three knuckles on each side edge of the jamb bordering the side edges of the door with the knuckles of the door being received in spaces between the three knuckles of the jamb on each side of the door.

7. A pen front as claimed in claim 1, further comprising a cross-over guard that is secured to the front of the door between feed openings that are provided in the door.

8. A pen front as claimed in claim 7, wherein the cross-over guard has studs which are inserted into mating holes in the door.

9. A pen front as claimed in claim 1, further comprising a spacer moveable to either hinged side of the door to create a vertical space between the door and the jamb to provide a clearance between the door and jamb as the door swings.

10. A pen front as claimed in claim 9, wherein the spacer is part of a shouldered bushing between the door and jamb and around a hinge rod of the door to the jamb.

11. A pen front as claimed in claim 1, wherein edges of the jamb have spaces between knuckles of the jamb in which knuckles of the door are received.

12. A pen front as claimed in claim 11, wherein at least one of the spaces is blocked by stops from either side.

13. A pen front as claimed in claim 11, wherein spaces on one side of the door are spanned by a hinge rod and on the other side of the door are blocked by stops.

14. A pen front as claimed in claim 1, further comprising a pivoting latch handle that latches the door to the jamb in any configuration of the door, whether it opens in or out, hinged left or right, in any combination.

15. A pen front as claimed in claim 14, wherein the handle is received in a U-shaped catch channel.

16. A pen front as claimed in claim 15, wherein the handle is pivotally attached to the jamb and the catch channel is affixed to the door.

17. A pen front as claimed in claim 1, wherein both sides of the door and jamb have a lock or catch mount.

18. A pen front as claimed in claim 1, wherein both sides of the door and jamb have sets of hinge holes that are alignable with one another.

19. A pen front as claimed in claim 1, wherein the jamb has a recess that defines a space opposite a hinged side to let a knuckle opposite of the hinged side of the door to swing through the space.

20. A pen front as claimed in claim 19, wherein the recess has a web of plastic recessed inwardly from a face surface of the door jamb and outwardly from an inner edge of the door jamb to define the space opposite the hinged side to let the knuckles opposite of the hinged side of the door to swing through the space.

21. A molded plastic pen front including a door jamb and a door wherein both sides of the door and door jamb have interdigitating knuckles through which a rod can be inserted to create a hinge joint on either side of the door, further comprising a door stop configured to be assembled to the pen front whether the door is hinged on one side or the other and whether the door swings in or swings out, and wherein the door stop is dog leg shaped.

22. A pen front as claimed in claim 21, wherein the door stop is received in a recess of the jamb.

23. A pen front as claimed in claim 22, wherein the door stop is secured to a web of plastic in the recess of the jamb and abuts against the door when the door is closed.

24. A molded plastic pen front including a door jamb and a door wherein both sides of the door and door jamb have interdigitating knuckles through which a rod can be inserted to create a hinge joint on either side of the door, further comprising a spacer moveable to either hinged side of the door to create a vertical space between the door and the jamb to provide a clearance between the door and jamb as the door swings.

25. A pen front as claimed in claim 24, wherein the spacer is part of a shouldered bushing between the door and jamb and around a hinge rod of the door to the jamb.

26. A molded plastic pen front including a door jamb and a door wherein both sides of the door and door jamb have interdigitating knuckles through which a rod can be inserted to create a hinge joint on either side of the door, wherein edges of the jamb have spaces between knuckles of the jamb in which knuckles of the door are received, and wherein spaces on one side of the door are spanned by a hinge rod and on the other side of the door are blocked by stops.

27. A molded plastic pen front including a door jamb and a door wherein both sides of the door and door jamb have interdigitating knuckles through which a rod can be inserted to create a hinge joint on either side of the door, further comprising a pivoting latch handle that latches the door to the jamb in any configuration of the door, whether it opens in or out, hinged left or right, in any combination.

28. A pen front as claimed in claim 27, wherein the handle is received in a U-shaped catch channel.

29. A pen front as claimed in claim 28, wherein the handle is pivotally attached to the jamb and the catch channel is affixed to the door.

30. A molded plastic pen front including a door jamb and a door wherein both sides of the door and door jamb have interdigitating knuckles through which a rod can be inserted to create a hinge joint on either side of the door, wherein:
the jamb has a recess that defines a space opposite a hinged side to let a knuckle opposite of the hinged side of the door to swing through the space; and
the recess has a web of plastic recessed inwardly from a face surface of the door jamb and outwardly from an inner edge of the door jamb to define the space opposite the hinged side to let the knuckles opposite of the hinged side of the door to swing through the space.

* * * * *